United States Patent [19]

Hunter

[11] Patent Number: 5,050,374
[45] Date of Patent: Sep. 24, 1991

[54] GASIFICATION/COMBUSTION SYSTEM

[76] Inventor: John Hunter, 34 Campus Avenue, Edinburgh, EH10 6QU, Scotland

[21] Appl. No.: 561,619

[22] Filed: Aug. 1, 1990

[51] Int. Cl.[5] .............................................. F02C 3/28
[52] U.S. Cl. ................................. 60/39.02; 60/39.12; 60/39.35; 48/197 R
[58] Field of Search ................. 60/39.02, 39.12, 39.35, 60/39.464; 48/61, 66, 68, 197 R; 110/263, 264; 431/7, 170

[56] References Cited

U.S. PATENT DOCUMENTS

| 4,039,272 | 8/1977 | Elliott | 431/7 |
| 4,148,186 | 4/1979 | Virr | 60/39.35 |
| 4,183,208 | 1/1980 | Horgan et al. | 60/39.35 |
| 4,282,009 | 8/1981 | Belke et al. | 60/39.35 |
| 4,317,658 | 3/1982 | Hendriks et al. | 60/39.35 |
| 4,401,440 | 8/1983 | Alink et al. | 60/39.35 |

FOREIGN PATENT DOCUMENTS

| PCT/US79/-00930 | 5/1981 | PCT Int'l Appl. |
| PCT/US79/-00843 | 3/1982 | PCT Int'l Appl. |
| SE8700327 | 1/1988 | PCT Int'l Appl. |
| 2008732A | 6/1979 | United Kingdom |
| 1581672 | 12/1980 | United Kingdom |

*Primary Examiner*—Louis J. Casaregola
*Attorney, Agent, or Firm*—Michael L. Keller

[57] ABSTRACT

A gasification/combustion system (10) for the gasification/combustion of non-gaseous fuels with single or combinable oxidants and sulphur sorbants is described. The system (10) includes a rotary fluidized bed gasifier (12) for gasifying a non-gaseous fuel, the outlet of the gasifier (12) being connected to a gas turbine (14) through gas cleaners (46,50) for removing particles from the fuel gas, and an afterburner (16) for burning off the fuel gas to produce combustion gases for supply to a gas turbine (14). The system (10) also includes a steam cooling circuit which is provided to cool the fuel gas flow through system (10) and which includes a steam turbine (26). Embodiments of the system (10) are described with accompanying drawings.

20 Claims, 5 Drawing Sheets

GASIFICATION/COMBUSTION SYSTEM

The present invention relates to a gasification/combustion system and particularly to a gasification/combustion system for the gasification/combustion of all types of fuel with single or combinable oxidants and sulphur sorbants.

A gasification/combustion system produces clean fuel/combustion gases containing low levels of sulphur/nitrogen oxides and solids content and has many applications including the direct firing of gas turbines, steam generation to drive steam turbines and combined cycle gas and steam turbines. Such a system includes a gasifier for gasification of the input fuel.

Conventional, fixed bed, solid fuel gasifiers are limited to low gasification rates per unit area of grate and produce incomplete gasification of the input fuel with resultant high carbon loss. They are also restricted to quality graded input fuels such as high swelling coals with limited market availability. Such gasifiers are expensive to manufacture and characteristically have high running costs.

Conventional fluidised flat bed gasifiers and combustors are an improvement over fixed bed gasifiers but usually require separate chambers to burn-off the primary bed char. They are limited by the narrow range of operational fluidisation velocity which limit such gasifiers to low gasification/combustion rates above which serious elutriation of bed carbon occurs. Furthermore, the smaller the size of solid fuel used the greater the elutriation rate and carbon loss. In addition, the bed carbon content (about 2 per cent) limits the fuel carbon surface area per unit volume of bed resulting in low gasification/combustion rates per unit distributor area and large bed areas for a given output, hence high manufacturing costs. Large fluidisation velocities must be avoided to reduce excessive corrosion/erosion wear to in-bed cooling tubes, such as steam tubes. In addition the ratio of maximum to minimum fluidisation velocity is limited so the output turndown is restricted to about 2:1 in flat bed gasifiers/combustors before the bed collapses onto the bed distributor due to insufficient fluidisation velocity to maintain the bed in a fluidised condition. This is a severe limitation in plant such as steam boilers, gas turbines etc. where turndowns in the range 3:1 to 5:1 are normally required.

With relatively large distributor areas, particularly in fluidised bed combustors, equitable distribution of the fuel over the bed are as difficult to achieve and the handling equipment expensive to manufacture. The lateral bed temperature is usually variable. In addition, such large beds are difficult to install successfully into newly manufactured plant, or are difficult to retrofit into existing plant, such as boilers. With their poor turndown, for a required total output, a range of smaller units may have to be installed to meet the full range of turndown, thus the total capital costs are greater than less units with larger turndown ratios.

Furthermore, the installation of conventional fluidised bed gasifiers/combustors into plant such as boilers, casts a radiation shadow over the combustion chamber and impedes radiation output to part of the heating surfaces e.g. in the furnace of a boiler.

In conventional PF fired plant, such as power station boilers, the complete combustion of the fuel particles necessitates massive combustion chamber volumes because combustion is very slow due to migration of the oxygen in the air supply to each fuel particle taking a very long time as the entrained particles flow through the combustion chamber. In addition, modern environmental protection practise requires low emission of sulphur and nitrogen oxides from the chimney exit and with the high combustion temperatures and high sulphur coals and oils used, expensive flue gas desulpherisation plant has to be fitted to PF plant to reduce sulphur oxides emission. However, this fails to reduce nitrogen oxides emission because this is dependent on a low temperature environment.

Present designs of centrifugal or rotary gasifiers/combustors expose their limitations. These are:

(i) where the fuel is coal large particles limit the carbon surface per unit of bed volume this results in large bed thickness, thus creating a large pressure loss through the bed. In addition, maximum gasification/combustion rates are lower, necessitating larger distributor areas for a given output, thus making them expensive to manufacture.

(ii) for gasifiers/combustors the bed has to be cooled to the operating temperature, usually, about 900° C. and to do this, three alternative methods are usually adopted. These are (a) the insertion of bed cooling tubes with cooling fluid flowing through them to cool the bed. So far this method has used water flowing through the tubes but the temperature rise has proved too small to absorb all the heat from the bed to reduce it to the required operational temperature. Steam has been proposed but if the tubes rotate with the bed a rotary seal problem arises whereby the steam passes through the rotary seal and its seating. The problem is that steam provides no lubrication to the seal and its seating and it cannot work without this. The second method is (b) cooling the bed by operating with high excess air levels flowing through the distributor. This, however, can only operate with a rotary combustor and not with a gasifier, since the normal volume of air supplied to a gasifier would be insufficient to cool the bed. With a combustor, the high excess air means very large bed area distributors, hence expensive to manufacture. The third method is (c) injecting steam into the bed to absorb surplus heat to keep the bed cool at the required temperature. This is usually carried out by stationary steam injector tubes located adjacent the rotating distributor. The disadvantage is that the stationary injector tubes foul the rotating fluidised bed during operation. Also steam cooling reduces power generation efficiency in combined cycle plant applications.

(iii) Without adequate and fast bed cooling the response to load change and turndown will be poor. With the present state of the art satisfactory bed cooling does not appear to have been achieved.

(iv) for burn-off of elutriated carbon particles from the bed inadequate provision appears to have been made for this in present designs. This is very important particularly in large output units.

(v) in combustor designs the maximum bed gas outlet temperature is around 900° C. This places a restriction on the application to gas turbines where development in the art is likely in the near future to result in advanced gas turbines designed for inlet gas temperatures as high as 1650° C. This eliminates the rotary fluidised bed combustor for this application but not the gasifier.

In summary it would appear present state of the art designs fail to provide satisfactory bed cooling and carbon refiring methods; bed thicknesses and pressure losses are excessive and maximum outputs for a given distributor diameter are too low.

It is an object of the present invention to provide a gasification/combustion system which obviates, or mitigates, at least one of the aforementioned problems.

According to a first aspect of the present invention there is provided a gasifier for use in a gasification system, said gasifier having fuel inlet means for being coupled to a non-gaseous fuel source and outlet means for providing fuel to a gasification location an annular fluidised bed for retaining particles of fuel to be combusted, said bed being disposed in an annular plenum chamber, a cylindrical outlet chamber disposed radially inwardly of said fluidised bed and in communication with said outlet means, said cylindrical outlet chamber having a base, a central shaft to which said fluidised bed is coupled, said central shaft having an axis of rotation, said fluidised bed being rotatable about said axis of rotation of said central shaft to generate a centrifugal force which acts on the particles to be combusted, said annular plenum chamber having oxidant inlet means for receiving an oxidant in a direction opposite to the direction of said centrifugal force whereby, in operation, particles to be gasified are retained in equilibrium in said fluidised bed, and rotation of said fluidised bed produces a fuel gas vortex travelling towards said outlet means in said outlet chamber, said outlet chamber having re-entrant wall reflector means for reflecting said fuel gas vortex in a direction away from said outlet means and central reflection means disposed in said base for reflecting said fuel gas vortex to said outlet means, said wall reflector means and said central reflector means being provided to increase the residence time of particles in said gasifier and maximise the combustion and carbon conversion of said fuel particles.

According to a second aspect of the present invention there is provided a gasification and combustion system for gasifying a non gaseous fuel, said gasification and combustion system comprising fuel storage and delivery means for storing and delivering a non gaseous fuel to a gasifier, gas cleaning means for receiving a gasified fuel output from said gasifier and for cleaning the gasified fuel output by removing ungasified fuel particles, afterburner means coupled to said gas cleaning means and to a gas turbine inlet for burning off fuel gas and adding a volume of dilution gas so that the volume and temperature of gas supplied to said gas turbine is maintained at predetermined levels.

According to a third aspect of the present invention there is provided a method of gasifying fuel in a gasifier comprising the steps of;

supplying particulate fuel over an annular plenum to a fluidised, gasification bed rotating said fluidised bed about a central axis to generate a centrifugal force on said fuel particles, supplying an oxidant to said fluidised combustion bed, said oxidant being supplied to create an oxidant drag force in a direction opposite to the direction of said centrifugal force, controlling the speed of rotation of said fluidised bed so that the centrifugal force and the oxidant drag force are substantially equal to suspend said fuel particles in equilibration for gasification thereof, cooling said fluidised bed during rotation, generating a gasified fuel vortex in an outlet chamber of said gasifier and maximising the flow path of said vortex in said chamber by reflecting the direction of the vortex in said outlet chamber at least twice to retain said vortex in said chamber to maximise gasification of said fuel particles.

According to a fourth aspect of the present invention there is provided a method of gasifying and combusting fuel to provide a sufficiently clean gas at desired pressure to a gas turbine, said method comprising the steps of gasifying a non-gaseous fuel, cleaning said gasified fuel, burning off remaining gas in said gasified fuel to provide a treated gas and adding a volume of dilution gas to said treated gas for providing a supply to gas to said gas turbine at a predetermined volume and temperature.

These and other aspects of the present invention will become apparent from the following description when taken in combination with the accompanying drawings in which.

Figure 1:
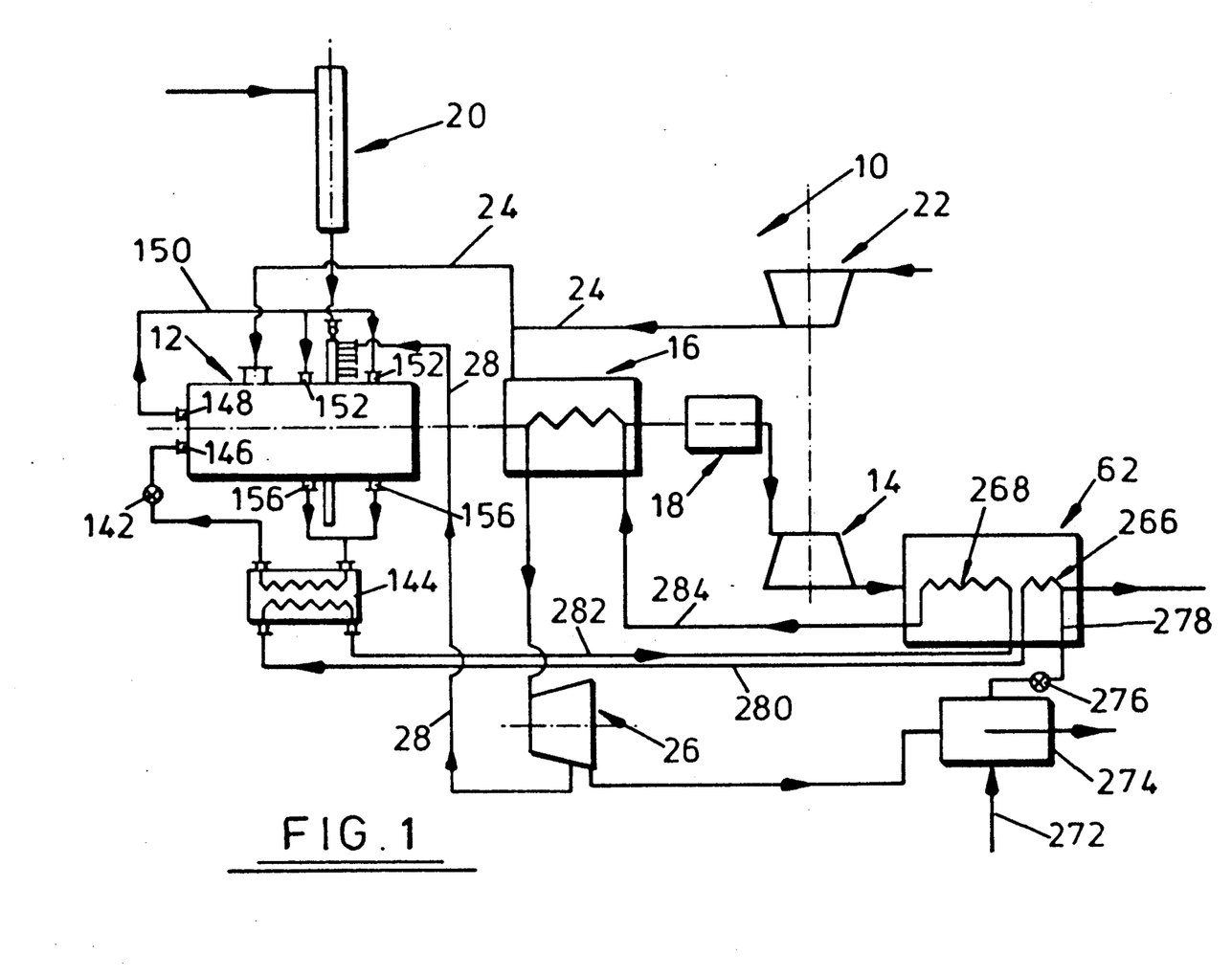
FIG. 1 is a block diagram of a gasification/combustion system in accordance with one aspect of the present invention.

Reference is firstly made to FIG. 1 of the drawings which shows a gasification/combustion system generally indicated by reference numeral 10. The gasification/combustion system 10 includes a rotary gasifier 12 for receiving solid fuel such as micro-sized coal and for gasifying that fuel to produce a fuel gas for supply to a gas turbine 14. An afterburner 16 and gas cleaner 18 are connected in series between the gasifier 12 and the gas turbine 14. The fuel gas is fed from gasifier 12 to afterburner 14 to be burned off and the resultant combustion gases are fed through gas cleaner 18 to turbine 14 and are expanded through turbine 14 to produce rotation of the gas turbine rotor (not shown) and consequently the generation of electrical power.

The operation of the rotary gasifier 12 will be described later in detail. However, it is understood that micro-sized coal, steam and compressed air are all fed to the gasifier and a gasification reaction takes place in that the solid fuel becomes a fuel gas for supply to the afterburner as hereinbefore described. Coal and limestone feed (pulverised in a PF preparation plant which is not shown in the interest of clarity) are fed to the gasifier 12 from a solid fuel supply 20. The compressed air is supplied from a compressor 22 which is connected to gas turbine 14 in such a manner that when the rotor of turbine 14 rotates, compressed air is supplied to gasifier 12 from compressor 22 as indicated by lines 24. Steam is provided from a steam turbine 26 which is connected to gasifier 12 as indicated by line 28. The steam turbine also forms part of a fuel gas cooling circuit which will be described later in detail.

The various constituent parts of the gasification system and the function thereof will now be described and reference is now also made to FIG. 2 of the drawings which is a more detailed diagrammatic view of the system. The micro-sized coal is fed to gasifier 12 from a fuel/fuel sulphur sorbent storage hopper 30. The coal/-limestone mixture flows in successive stages from storage hopper 30 into top lockseal hopper 32 and thence into bottom lockseal hopper 34. Control valves 36 and 38 open and shut to control the transfer of the coal/-limestone mixture. To prevent hold-ups of the flow of coal/limestone mixture in the top lockseal hopper, an airbelt 40 and valve 42 are provided and these components are actuated by compressed air supplied from compressor 22. The bottom lockseal hopper 34 includes a screwfeed 44 whereby coal/limestone mixture may be fed from the bottom hopper 34 to the gasifier 12. The screwfeed 44 is connected to a gear drive 46 and is also actuated by compressed air supplied from compresser 22.

As hereinbefore described, the solid fuel fed into gasifier 12 is gasified and becomes a fuel gas which flows out of gasifier 12 and into a cyclone gas cleaning device 46 which removes the bulk of the ash/carbon/spent limestone particles from the fuel gas. The new relatively clean fuel gas then flows out of the cyclone gas cleaning device and into a gas cooler 48. The fuel gas is cooled as it flows through cooler 48 and the cooled fuel gas then flows through a rear porous ceramic gas cleaner 50 before flowing into afterburner 52 to be burned off. Compressed air is supplied to afterburner from compressor 22 and this air enters afterburner 52 through inlet 54. The hot combustion gases produced in the afterburner then flow through a front porous ceramic gas cleaner 56 before flowing (as indicated by line 58) into a mixing chamber 60 where the hot combustion gases are mixed with more compressed air supplied from compressor 22. This mixed gas then flows from chamber 60 to gas turbine 14 where the gases are expanded through turbine 14 to generate electrical power. The exhaust gases from turbine 14 flow into an exhaust steam boiler 62 before flowing into an exhaust chimney (not shown).

Figure 3:
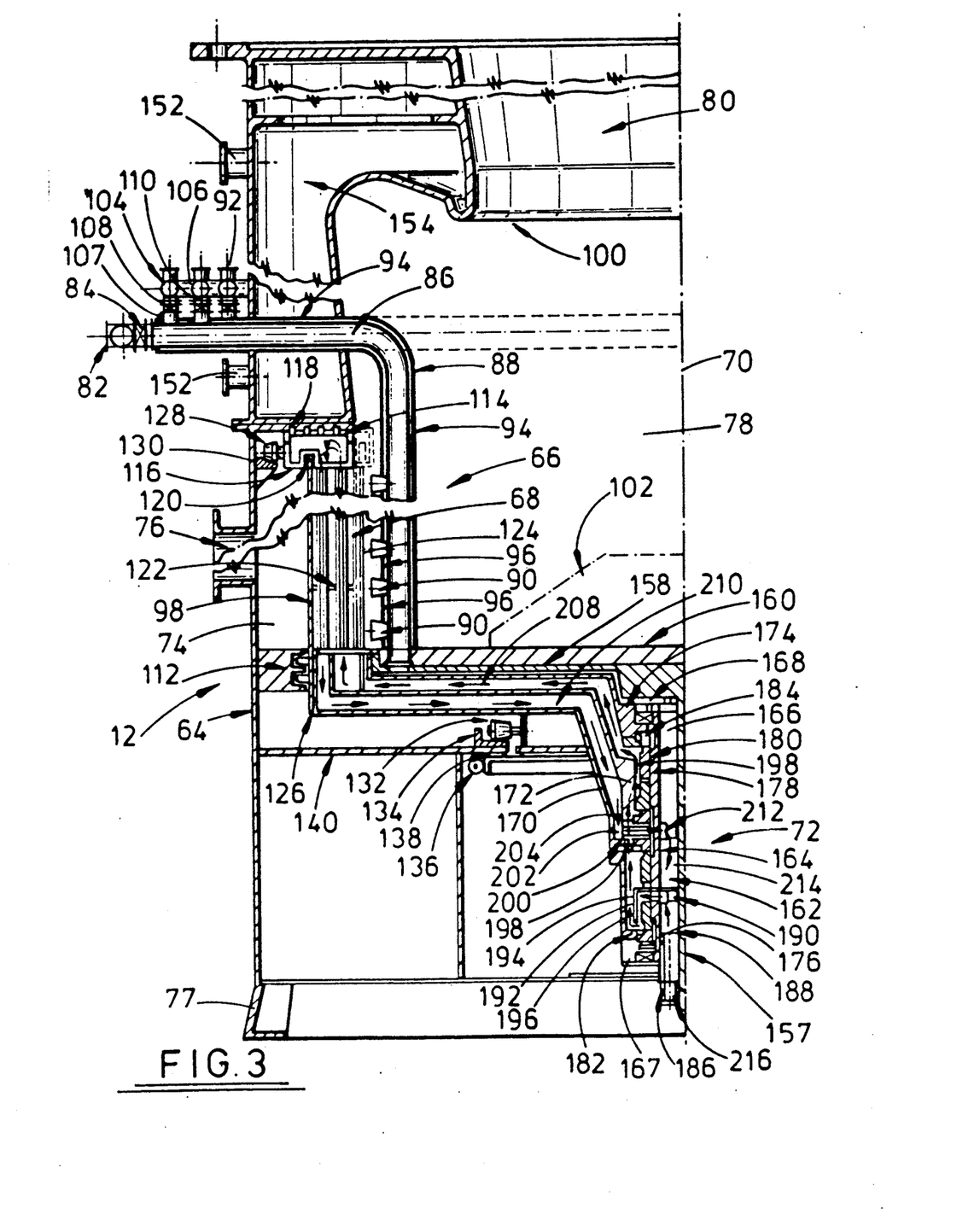
FIG. 3 is a sectional view of one half of a rotary gasifier for use in the gasification/combustion system shown in FIGS. 1 and 2.

The construction and operation of each of the constituent parts of the gasification system will now be described. Reference is made to FIG. 3 of the drawings which is a sectional view showing one half of a rotary gasifier 12 for use in the gasification system hereinbefore described. The gasifier 12 includes a generally tubular housing 64 (only one half of which is shown) in which an annular cup shaped member 66 is mounted. The internal upstanding walls of member 66, in use, provide an annular fluidised bed 68 as will be described later in detail. The member 66 is rotatable about axis 70 and is connected to a rotation mechanism 72 which effects rotation of the member 66 and which allows the passage of a cooling fluid therethrough to provide cooling of the bed 68 as will also be described later in detail. The housing 64 and the upstanding wall of member 66 define an annular plenum chamber 74 into which compressed air (from compressor 22) may be supplied through inlet 76. The member 66 defines a fuel gas outlet chamber 78 disposed radially inwardly of the bed 68 and in flow communication with an outlet 80 of housing 64 so that gasified fuel may flow out of housing 64.

Solid fuel is fed from bottom lockseal hopper 34 (FIG. 2) to inlet pipe 82 which is connected to a control valve 84 which is provided to control the flow rate of solid fuel to bed 68 in accordance with the load requirements of the gasifier. The solid fuel flows into the inner tube 86 of a pipe 88, and is distributed to the bed 68 through fluted openings 90 which are axially spaced round the inner surface of bed 68. Steam (from steam turbine 26, FIG. 2) is supplied to pipe 88 through a steam inlet 92. The steam flows through an annular outer pipe 94 surrounding inner tube 86, and flows through a series of holes 96 in outer pipe 94, facing bed 68. The mixing of the coal/steam/oxidant streams from the fuel injector tubes ensures satisfactory fuel delivery and distribution onto the bed surface which is rotating about axis 70. The solid fuel is therefore retained on bed 68 by the centrifugal force generated by the rotation of member 66.

The member 66 which provides bed 68 has an upstanding porous cylindrical distributer surface 98 through which compressed air in annular plenum chamber 74 may flow circumferentially to enter bed 68. In normal operation of the gasifier, gasification of the solid fuel disposed in bed 68 is achieved by passing compressed air through distributor surface 98 and into bed 68 thus creating small diameter bed bubbles which draw coal and limestone particles in their wake to react these particles with an oxidant (e.g. steam, oxygen in air or combinations of such oxidents) to produce a fuel gas vortex in outlet chamber 78. The bed particles are fluidised by the action of the oxidant flow through the bed which creates a drag force acting on the bed particles. This drag force is opposed by the centrifugal force acting on the bed particles and therefore these particles remain relatively stationary in the bed 68 until the gasification reactions and release of gas produces a reduction in the particle size and mass. When this happens the drag/centrifugal forces acting on the reduced particles become unbalanced and such particles are elutriated from the bed 68 and flow into chamber 78. Reduction of the speed of rotation of the bed 68 whilst maintaining the same oxidant flow results in a rapid unbalancing of the drag/centrifugal forces acting on the bed particles and provides a method of rapidly emptying the bed 68 of particles when required.

Co-incident with the in-bed reactions producing fuel gas, reactions also take place at the rotating bed 68/chamber 78 interface. These reactions contribute to the fuel gas calorific value of the fuel gas vortex in chamber 78.

The gasifier 12 is designed for a range of sizes in solid fuels but is especially designed for pulverised fuel sizes. Liquid and gaseous fuels and all fuels can be in-mixed with fuel sulfur sorbents such as small size limestone to absorb the fuel sulfur content to reduce sulfur and nitrogen emissions at the chimney. Small size solid fuel, liquid and gaseous fuels result in a large number and concentration of fuel bed particles or molecules per unit volume of bed volume. This ensures very high carbon surface per unit of bed volume, this surface is exposed to the oxidant input flow as it passes through the fluidised bed 68 and this results in very high reaction rates of gasification both in-bed and at the bed/chamber interface.

As the bed 68 is rotating about axis 70, the fuel gas flowing into chamber 78 flows as a continuous vortex or spiral which flows generally towards outlet 80. The housing 64 is shaped to provide a curved overlapping surface or gas re-entrant wall reflector 100. The gas flows in a generally upwards spiral until it strikes the re-entrant wall reflector 100 whereupon the gas reverses direction and flows downwards, at a smaller mean spiral diameter until the gas vortex strikes a central reflector cone 102 disposed on the base of member 66, whereupon the gas vortex changes direction once again and flows out of outlet 80 as a continuous rotating core of fuel gas, ash etc. The re-entrant wall reflector 100 and central reflector cone 102 are provided to maximise the residence time of the fuel gas in chamber 74 and therefore increase the turbulent interface reactions between ungasified carbon particles and surplus oxidant elutriated from the bed 68, and hence increase the gasification per unit input of fuel. The dimensions of the re-entrant wall reflector 100 are designed to provide a specific gasification rate per unit of solid fuel input.

In addition to the solid fuel inlet pipe 82 and steam inlet 92, two further inlet pipes are connected to the gasifier, these being a premix gas inlet pipe 104 and a nitrogen gas inlet pipe 106. The premix gas inlet pipe is connected in flow communication with inner tube 86 and a retractable spark plug 107 is disposed adjacent the connection between inner tube 86 and premix gas inlet 104. The bed 68 must be ignited before normal operation of the gasifier may commence and the procedure is as follows. Coal/limestone mixture is pumped onto rotating bed 68 through fluted openings 90 as hereinbefore described. Valve 84 is then shut to prevent solid fuel being supplied into inner tube 86. A valve 108 disposed at premix gas inlet 104 is then opened to allow the premix gases to flow into inner tube 86. Spark plug 107 is then actuated to produce a spark which ignites the premix gases in inner tube 86. The hot combustion gases then flow through openings 90 and onto the bed 68 surface. At the same time, compressor 22 is switched on at a low speed and compressed air flows into plenum chamber 74, through porous surface 98 and into bed 68. The ignition of bed 68 is therefore progressively established under controlled conditions. When the bed 68 is ignited, the premix gas valve 108 is closed and the solid fuel valve 84 is opened to commence normal operation of the gasifier as hereinbefore described.

Prior to the start of the ignition cycle as described above, the pipe 88 and the gasifier chamber 78 are purged with nitrogen gas to evacuate any explosive residual gas from the gasifier. The nitrogen is provided through inlet 106 and safety valve 110 into the inner tube 86 of pipe 88. The nitrogen purges the tubes and vortex chamber and all of the ancillary plant and is finally evacuated through an exhaust valve (not shown) to atmosphere.

As hereinbefore described, cup shaped member 66 (providing bed 68) has a porous metal cylindrical distributor wall 98 which, with housing 64, defines annular plenum chamber 74. The plenum chamber 7 is sealed at its lower end by a graphite, or equivalent labyrinth seal 112 disposed between housing 64 and the lower end of cylindrical wall 98. Another deep labyrinth type seal 114 is disposed between a header portion 116 disposed at the top of distributer wall 98 and a portion 118 of housing 64 which defines the outlet chamber 78, thus sealing the upper end of plenum chamber 74. The cylindrical wall 98 expands during operation of the gasifier and the upper end of wall 98 is received in an annular recess 120 of header portion 116 and engages a resilient soft seal therein to prevent gas leakage from bed 68.

The bed 68 is fitted within bed coolant tubes 122 and above bed coolant tubes 124. In normal operation of the gasifier, coolant flows through these tubes 122, 124 to remove excess heat from the bed 68. The coolant tubes are welded at their top ends to header portion 116 and at their bottom ends to bottom thermofluid header 126. As herebefore described, the member 66, including distributor wall 98, top and bottom headers 116 and 126, in bed and above bed coolant tubes 122, 124 and bed 68 itself, rotates about axis 70 under the influence of rotation mechanism 72. The upper header portion 116 is connected to first spring-headed taper roller bearing 128 which engages an annular track 130 disposed around the internal surface of housing 64. Similarly, the base of member 66 is connected to second roller taper bearing 132 which engages an annular track 134 disposed substantially above the gear drive 136 of mechanism 72. A further seal 138 is disposed between gear drive 136 and a plate 140 on which track 134 is mounted.

The bed 68 is maintained at an operating temperature by a cooling fluid which flows through bed coolant tubes 122, 124 to absorb exothermic heat release from the fuel bed and chamber gasifiction reactions. The cooling medium used is Dowtherm A which is chosen because of its lubrication and heat capacity properties when used with bearings, seals and the like. It is understood, however, that an alternative cooling medium could be used to achieve bed cooling.

Reference is once again made to FIG. 1 of the drawings which illustrates the flow-path of coolant through the gasifier 12. The coolant flows in a closed pipe circuit, driven by pump 142 leaving, relatively cold, heat exchanger 144 before flowing into the base 146 of gasifier 12. The cooling fluid flows through the rotation and coolant flow mechanism 72 as will be discarded, before flowing through bed cooling tubes 122 and 124 to absorb excess heat in bed 68. The heated coolant then flows out of gasifier at position 148 and flows through external pipework 150 before flowing through inlets 152 of an ash chamber coolant jacket 154. The coolant jacket 154 is provided to cool the fuel gas flowing out of outlet 80. The coolant flows out of coolant jacket 154 through outlets 156 before returning to heat exchanger 144 to be cooled to its original temperature to be recirculated through gasifier 12. The pump 142 controls the flow rate of coolant in accordance with the gasifier heat release requirements.

The rotation and coolant flow mechanism 72 includes a stationary shaft 157 disposed on axis 70, a stationary disc 158 with ceramic cover 160 and a fixed annular sleeve 162. The annular sleeve 162 supports fixed cylindrical sleeves 164 and 166 with dog spline connections, superimposed on which rotates, bearings 167 and 168. The bearings 167 and 168 and dog spline sleeves support the various rotating casing portions 170, 172 and 174 which, together with a series of fixed seals 176, 178 and 180 and rotating seatings 182 and 184, form the internal rotating passageways through which the coolant flows.

The flow path of coolant is as follows. The coolant enters the mechanism 72 through an inlet 186 and then flows through fixed inlet annular sectorial passages 188 thence through inlet port 190 and radial holes and is diverted axially by a deflector cylinder 192 over the rotary seals 194. The flow then reverses, flowing beneath the outer seal section casing 196 thence through axial peripheral cross ports 198 in the components 198, 200, 202, 204 and intermediate rotating casing 172 to flow into the radial flow duct 208, thence the flow enters half of the gasifier coolant tubes 122 (fitted with tubes stays 118) and reversing at the top header 116 returns through the other half of the coolant tubes 122. From there it enters the drive section again through the annular radial return duct 210 and outlet annular sectorial passages 214 incorporated into the annular sleeve 162 exiting through the outlet pipes 216.

Figure 4:
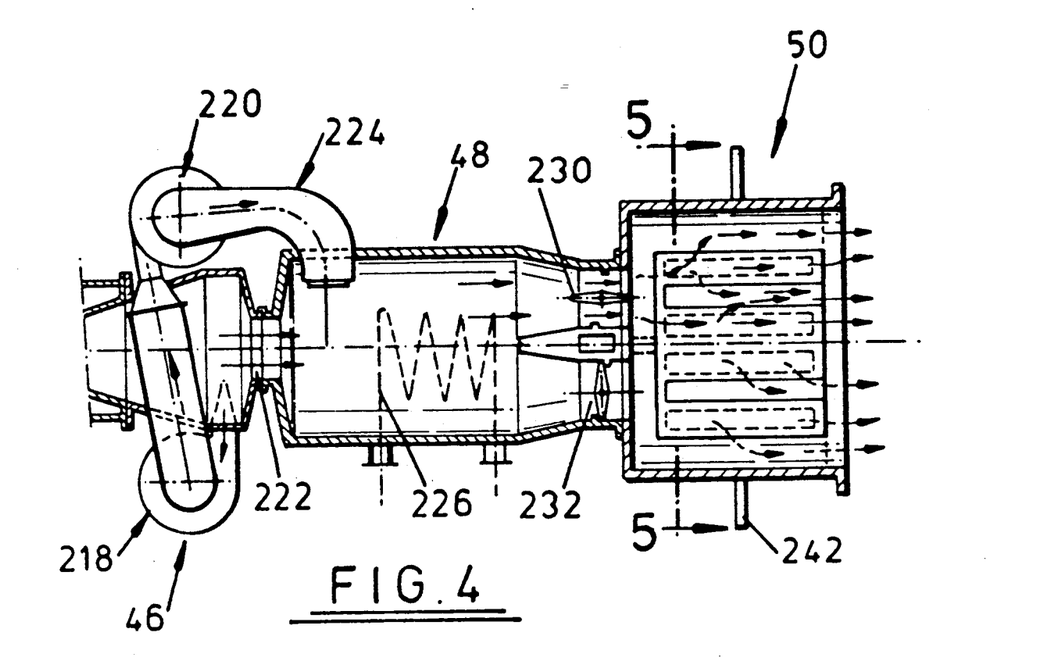
FIG. 4 is a partly sectional view showing a cyclone gas cleaner connected to an afterburner which is connected to a porous ceramic gas cleaner, these being constituent parts of the gasification/combustion system shown in FIGS. 1 and 2.

Reference is now made to FIG. 4 of the drawings which shows the cyclone gas cleaning device 46 hereinbefore described. The fuel gas (containing particles of ash/carbon/spent limestone) flows out of the outlet of the gasifier and into cleaning device 46. A portion of the fuel gas is diverted through both the primary 218 and secondary 220 cyclones of device 46, the remainder of the gas flowing through outlet 222. The fuel gas flows as a vortex and the diameter of the device 46 is such that the bulk of the ash/carbon/spent limestone particles flow into the cyclones 218 and 220. The concentration of the ash/carbon/spent limestone particles in the cyclone gas flow is very high and the gas flow low, so that relatively small body diameter cyclones can be designed. The bulk of the relatively clean fuel gas flows through the cyclone outlet 222 and enters the gas cooler 48 where it is joined by the flow from the secondary cyclone outlet duct 224, the bulk of the ash/carbon/spent limestone particle having been extracted by the cyclones. The relatively clean fuel gas flowing through the gas cooler 48 may, or may not, be cooled in temperature, depending on whether steam tube heating surface 226 (which will be described later in detail), is provided.

Figure 5:
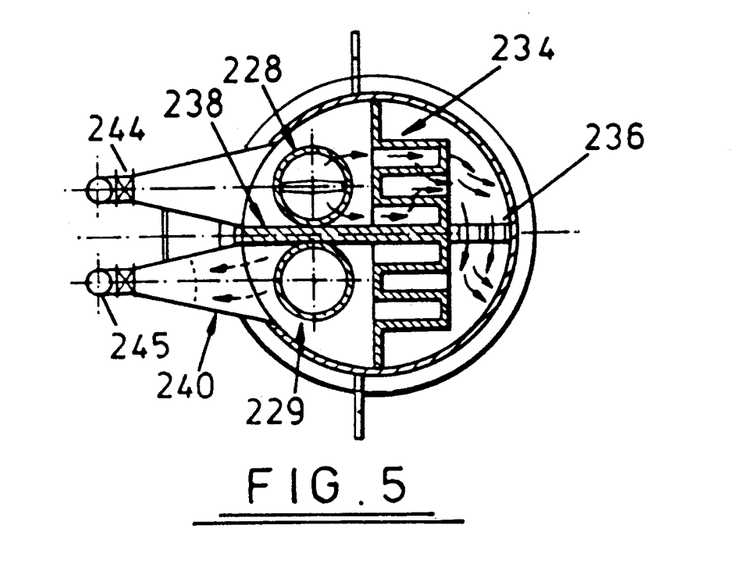
FIG. 5 is a sectional view taken on lines 5—5 of FIG. 4.

The gas then flows into the rear porous ceramic gas cleaner 50, through one of two gas cooler outlet ducts 228, 229 (FIG. 5) both of which are fitted with high temperature refractory/metal dampers 230 and 232, respectively. The dampers 230, 232 permit the gas flow to enter one of the two sections of the porous ceramic, tile gas cleaner 50 (for example at 234) and flow into the other through the holes 236 in the dividing wall 238. The gas thus flows through the active ceramic tile section of the gas cleaner. Fine dust is trapped on the surface of the inlet side and falls into the hopper cone at 240. At set, predetermined, intervals of time, the damper controls reverse the damper positions and the duct, 229 which was closed, now opens, and the duct 228, which was open, now closes. This causes the gas to flow through holes 236 in the opposite direction and permits reverse-flush cleaning of the dirty side of the non-active ceramic tile section which is not in use, without disturbing or shutting off the gas flow.

Figure 6:
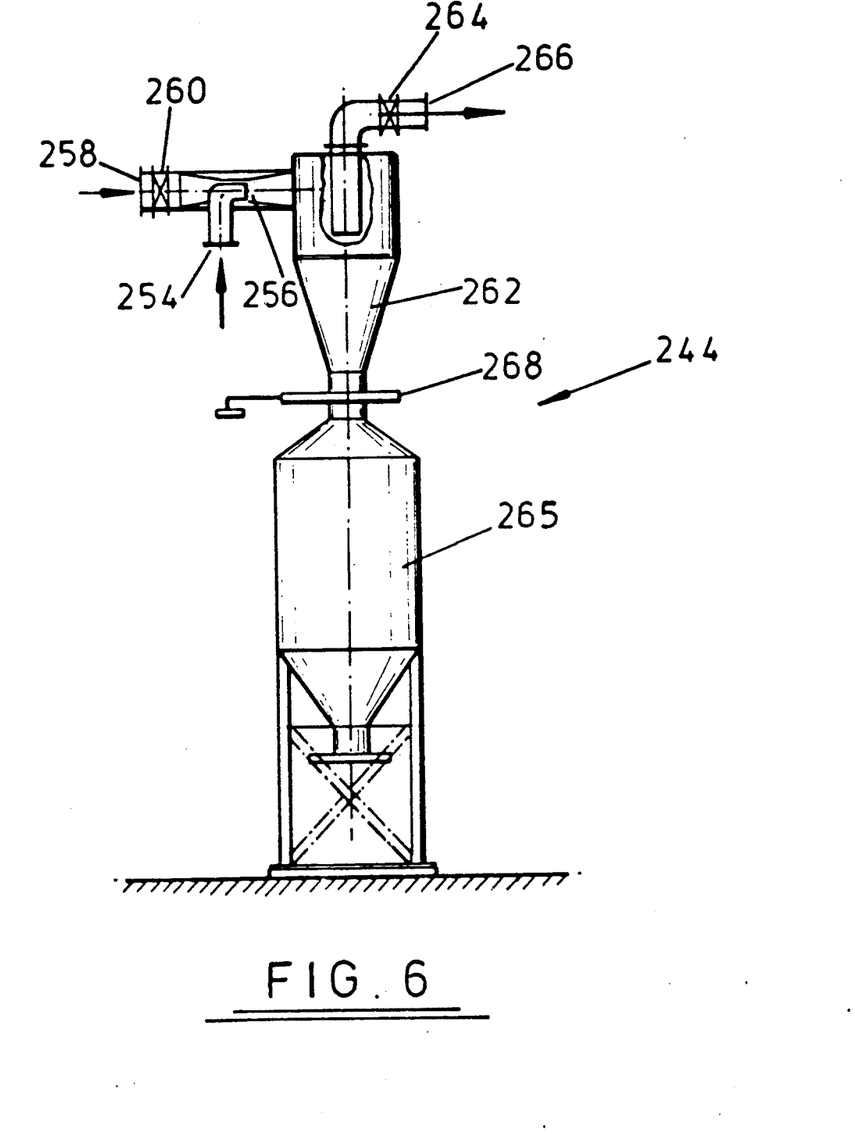
FIG. 6 is a part elevational view of a storage and separation device which forms part of the gasification/combustion system.

Reverse flush cleaning of the non-active ceramic tile section is carried out by opening the reverse flush valve 242 and the valve 244 at the base of the dust hopper 240 which connects with a pipeline 245 leading to a central ash/carbon/spent limestone storage hopper and separation equipment 248 (FIG. 6). The pressure drop over the non-active porous ceramic tiles 234 thus created, causes the dust collected on the tile surfaces during the previous cycle to be carried into hopper 240. This action, however, is preceded by a nitrogen gas purge admitted through a pipe and valve at 242. This ensures complete safety by evacuating any potential explosive gases collected during the previous cycle.

Reference is now again made to FIG. 2 of the drawings which illustrates that the fuel gas now flows into the afterburner to burn off the fuel gas. Cooling air, may or may not, be introduced through the air inlet duct 54 depending on the system design. The hot gas flows through the afterburner and may, or may not, be cooled in temperature, depending on, whether or not, afterburner steam tube heating surface 248 is provided. The hot combustion gases then enter the front porous ceramic gas cleaner 56 which is similar to the rear ceramic gas cleaner 50 previously described. It is noted that, depending on the design of the overall system, the gas cleaner options available are (i) to install a rear porous ceramic gas cleaner only, or (ii) a front porous gas cleaner only, or (iii) install both.

The clean, hot gas then flows from front porous ceramic gas cleaner 56 to mixing chamber 60 where the hot gas may be cooled to the required gas turbine inlet temperature and may or may not, depending on the requirements of the turbine 14, be premixed with more air from compressor 22. The total gas flow is then fed to, and is expanded through, gas turbine 14 to generate electrical power. The exhaust gases from turbine 14 then flow into exhaust steam boiler 62 which is connected to a steam cooling circuit as will be described. The exhaust gases then flow to a exhaust chimney.

Figure 2:
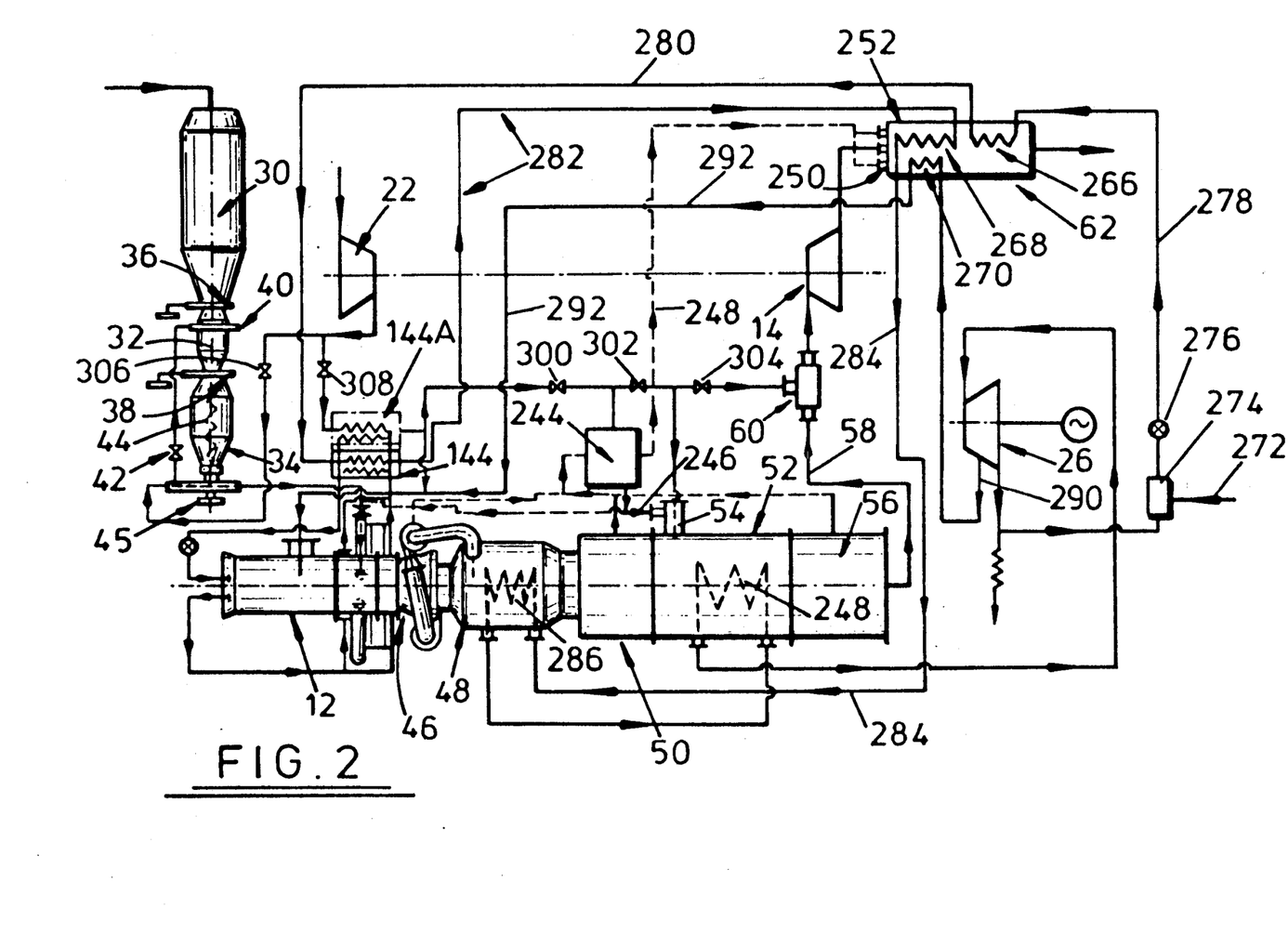
FIG. 2 is a more detailed diagrammatic view showing various constituent parts of the gasification/combustion system shown in FIG. 1.

Reference is now made to FIGS. 2 and 6 of the drawings which illustrate a carbon recycling system which forms part of the gasification system hereinbefore described. The recycling system includes a storage and separation device 244 which is connected (as indicated by the broken lines in FIG. 2) to cyclone gas cleaning device 46 and front and rear porous ceramic gas cleaners 50 and 56 (or to only one of these if only one is provided). Any remaining ungasified fuel carbon particles, or spent limestone and ash particles which are trapped in cleaners 46, 50 and 56 are conveyed into device 244. The separation device 244 separates the ungasified fuel carbon particles and the separated fuel carbon particles are conveyed through a carbon recycle duct 246 to afterburner 52 through inlet 54 to allow the ungasified fuel particles to be burned off. Alternatively, the ungasified fuel particles may be fed back to the inlet of gasifier 12. The ungasified fuel particles may also be fed to a burner recycle duct 248 and into carbon/gas, or, carbon/oil burners 250 and carbon recycle combustion chamber 252, designed to burn off the recycled carbon particles by elevating their temperature to ignition temperature in order to burn them off with minimum consumption of oil or gas in the burners, the released heat being recoverable.

The storage and separation device 244 is best shown in FIG. 6. The carbon/ash/spent limestone particles flow into device 244 through inlet pipe 254 and then through venturi pipe 256. Compressed air is supplied through inlet pipe 258 and valve 260 and this air supply is mixed with the flow of particles from pipe 254. The total flow mixture now enters the cyclone 262 which is designed with a cut-off fraction corresponding to the size range of the ash and spent fuel sulfur sorbent material which falls into the cyclone hopper 262 while the bulk of the separated carbon material, being smaller and lighter in weight, flows out of the cyclone 262 in the airstream through the valve 264 and outlet pipe 266. A damper valve 268 opens on completion of the above cycle and the collected ash/fuel sulfur sorbent material, falls by gravity into the storage hopper 264, to be disposed of at intervals.

Reference is now made to FIGS. 1 and 2 of the drawings which show the steam cooling circuit hereinbefore described. The gas turbine exhaust steam boiler 62 is connected to the steam cooling circuit and includes an economiser 266, an evaporater 268, and a superheater 270. Water is supplied to the steam cooling circuit through a make-up feedwater pipe 272 which mixes this make-up water with steam returning to steam turbine condenser 274 from steam turbine 26. The water/steam is pumped around the circuit by a feedpump 276 and the flow path of the water/steam is as follows: The preheated feedwater flows through pipework 278 to economiser 266 from whence the water flows through pipework 280 to the inlet of thermofluid/water heat exchanger 144. In passing through this heat exchanger 144 the feedwater is heated to a higher temperature by the contra-flow of heat to the water imparted by the thermofluid flow between the heat exchanger 144 and the gasifier 12 coolant tubes and heating surface. The preheated feedwater now flows through pipework 282 and enters the evaporator 268 of the gas turbine exhaust steam boiler 62, thence it flows via pipework 284 into and contra-flow through the gas cooler steam heating surface 286 of gas cooler 48 and the afterburner 52 steam heating surface 248 wherein, now in the form of steam, it flows through an integral superheater to elevate it to the required temperature and pressure before entering the steam turbine 26. The steam now flows through the steam turbine, generating further electrical power.

The steam turbine is of the condensing pass-out type. The pass-out flow of steam (from outlet 290, FIG. 2) is at a rate corresponding to the steam flow requirements of the gasifier 12. To achieve this the steam leaves the steam turbine at the required pressure and then flows through the gas turbine exhaust boiler superheater 270 to superheat it to the required temperature. The steam then flows in pipework 292 to the gasifier 12.

Various modifications may be made to the embodiment hereinbefore described without departing from the scope of the present invention. The coolant tubes in the gasifier which carry coolant for removing excess heat generated in the gasification reactions, may be disposed in the fluidised bed, adjacent to the fluidised bed, or both in and adjacent the fluidiser bed. The gasifier hereinbefore disclosed is generally vertically oriented, however, other orientations, for example horizontal, may be used. A group of similar vertically oriented gasifiers may be arranged in a circular orientation so that each gasifier provides fuel gas for a single outlet duct leading to a single gas turbine. Such an arrangement is relatively compact. A thermofluid/air heat exchanger 144A (shown in FIG. 2) may be connected in series with heat exchanger 144, to increase the temperature of the compressed air to be supplied to the gasifier 12 and the mixing chamber. With such an arrangement, the volume flow of the compressed air to the mixing chamber must be increased to produce the required reduction in temperature of the gas for supply to the turbine. The gasification system may be controlled by a computer, the computer being programmed to control the operation of the constituent devices of the system and being coupled to flow rate dampers 300, 302, 304, 306 and 308 and valves 36, 38 and 42. The computer would control the temperature, gas and fluid flow rates and pressure and fuel gas composition and calorific value throughout the system.

An advantage associated with the present invention is that the gasification/combustion system provides a gas turbine with combustion gases having a low solids content with low levels of sulphur and nitrogen oxides. The gasification system is relatively compact, inexpensive and is simple to install or to retrofit into existing plant. The gasification/combustion system can be used in combination with most classes of steam and gas engines. For example, stationary land-based engines and engines used for marine or rail transport use. The system may also be used for boilers, furnaces, etc and the gasifier may be used for the production of fuel gases for manufacture of synthesis gas for the chemical or gas industries.

The gasifier used in the gasification system has the advantage that the residence time of the fuel gas vortex in the outlet chamber is maximised to ensure maximum gasification of solid fuel particles. Effective bed cooling is achieved by using Dowtherm A as a coolant flowing through in bed or above bed cooling tubes. Fuel bed gasification reactions are enhanced by using a fuel bed particle size which provides a higher than normal bed carbon surface area per unit volume of bed.

I claim:

1. A gasifier for use in a gasification system, said gasifier having fuel inlet means for being coupled to a non-gaseous fuel source and outlet means for providing fuel to a gasification location an annular fluidised bed for retaining particles of fuel to be combusted, said bed being disposed in an annular plenum chamber, a cylindrical outlet chamber disposed radially inwardly of said fluidised bed and in communication with said outlet means, said cylindrical outlet chamber having a base, a central shaft to which said fluidised bed is coupled, said central shaft having an axis of rotation, said fluidised bed being rotatable about said axis of rotation of said central shaft to generate a centrifugal force which acts on the particles to be combusted, said annular plenum chamber having oxidant inlet means for receiving an oxidant in a direction opposite to the direction of said centrifugal force whereby, in operation, particles to be gasified are retained in equilibrium in said fluidised bed, and rotation of said fluidised bed produces a fuel gas vortex travelling towards said outlet means in said outlet chamber, said outlet chamber having re-entrant wall reflector means for reflecting said fuel gas vortex in a direction away from said outlet means and central reflection mean disposed in said base for reflecting said fuel gas vortex to said outlet means, said wall reflector means and said central reflector means being provided to increase the residence time of particles in said gasifier and maximise the combustion and carbon conversion of said fuel particles.

2. A gasifier as claimed in claim 1 further comprising fluidised bed and fuel gas vortex cooling means disposed in proximity to said annular fluidised bed for maintaining the temperature of said fluidised bed and fuel gas vortex within a predetermined temperature range.

3. A gasifier as claimed in claim 1 wherein said fluidised bed and fuel gas vortex cooling means includes narrow bore cooling fluid conduits coupled to a source of cooling medium, said conduits being dimensioned and proportioned so that the overall thickness of the fluidised bed is relatively small for minimising the pressure drop across said fluidised bed in use.

4. A gasifier as claimed in claim 3 wherein a porous oxidant distributor is disposed in said plenum chamber between said oxidant inlet means and said annular fluidised bed, said porous oxidant distributor providing distribution of said oxidant substantially over the area of said annular fluidised bed to facilitate equilibration of said fuel particles therein.

5. A gasifier as claimed in claim 1 wherein said fuel inlet means includes first auxiliary inlet means for introducing a pre-ignition mixture into said gasifier and second auxiliary means for introducing an inert gas into said gasifier to purge said gasifier of combustion fuel.

6. A gasifier as claimed in claim 5 wherein ignition means are disposed adjacent said second auxiliary inlet means to allow pre-ignition of said mixture.

7. A gasifier as claimed in claim 6 wherein said inlet means is coupled to third auxiliary inlet means for introducing steam to provide a fuel-steam mixture from said inlet means to said fluidised bed.

8. A gasifier as claimed in claim 1 wherein said fuel inlet means is coupled to a lock seal hopper from which fuel is delivered to said gasifier means, said lock seal hopper being sealed to prevent escape of compressed air.

9. A gasification and combustion system for gasifying and combusting a non gaseous fuel having a gasifier as claimed in claim 1, said gasification and combustion system comprising,
fuel storage and delivery means for storing and delivering a non gaseous fuel to said gasifier,
gas cleaning means for receiving a gasified fuel output from said gasifier and for cleaning the gasified fuel output by removing ungasified fuel particles, and
afterburner means coupled to said gas cleaning means and to a gas turbine inlet for burning off fuel gas and adding a volume of dilution gas so that the volume and temperature of gas supplied to said gas turbine is maintained at predetermined levels.

10. A system as claimed in claim 9 wherein said gas cleaning means consists of cyclone gas cleaning means coupled to the outlet of said gasifier, said cyclone gas cleaning means having separation means for dividing said gasified fuel output and for extracting coarse gasified particles from said gas to provide a partially cleaned gas, and filter means for receiving the partially cleaned gas and for removing fine uncombusted particles therefrom.

11. A system as claimed in claim 10 wherein the inlet of said filter means is coupled to the outlet of said afterburner means and the outlet of the filter means is coupled to said gas turbine.

12. A system as claimed in claim 10 wherein the inlet of said filter means is coupled to the outlet of said cyclone gas cleaning means.

13. A system as claimed in claim 12 wherein said filter means is provided by a ceramic filter.

14. A system as claimed in claim 10 wherein gas mixing means is coupled to the outlet of said afterburner means or the output of the filter means, said gas mixing means allowing mixing of said gas with air prior to passing said mixture to said gas turbine inlet.

15. A system as claimed in claim 9 wherein storage and separation means are coupled to said gas cleaning means, said gasifier and said afterburner means whereby ungasified carbon, ash and spent limestone are supplied to said storage and separation means and said ungasified carbon is separated from said ash and limestone and is fed back to said gasifier or said afterburner or separate carbon burners for re-combustion.

16. A system as claimed in claim 9 wherein gas cooling means are coupled to said gasifier, said gas cleaning means and said afterburner whereby gas passing through said gasification system is cooled to a temperature level suitable for being supplied to said gas turbine.

17. A method of gasifying fuel in a gasifier comprising the steps of;
supplying particulate fuel over an annular plenum to a fluidised, gasification bed
rotating said fluidised bed about a central axis to generate a centrifugal force on said fuel particles,
supplying an oxidant to said fluidised combustion bed, said oxidant being supplied to create an oxidant drag force in a direction opposite to the direction of said centrifugal force,
controlling the speed of rotation of said fluidised bed so that the centrifugal force and the oxidant drag force are substantially equal to suspend said fuel particles in equilibration for gasification thereof,
cooling said fluidised bed during rotation,
generating a gasified fuel vortex in an outlet chamber of said gasifier and
maximising the flow path of said vortex in said chamber by reflecting the direction of the vortex in said outlet chamber at least twice to retain said vortex in said chamber to maximise gasification of said fuel particles.

18. A method of gasifying and combusting fuel to provide a sufficiently clean gas at desired pressure to a gas turbine, said method comprising the steps of gasifying a non-gaseous fuel as claimed in claim 17,
cleaning said gasified fuel,
burning off remaining gas in said gasified fuel to provide a treated gas, and
adding a volume of dilution gas to said treated gas for providing a supply of gas to said gas turbine at a predetermined volume and temperature.

19. A method as claimed in claim 18 including the steps of collecting uncombusted particles, separating the uncombusted fuel particles and, regasifying or burning off the uncombusted fuel particles.

20. A method as claimed in claim 18 including the step of cooling said gasified fuel to provide gas at said desired temperature.

* * * * *